United States Patent
Laferte et al.

(10) Patent No.: US 9,708,519 B2
(45) Date of Patent: Jul. 18, 2017

(54) PSA OF RENEWABLE ORIGIN WITH TEMPERATURE-STABLE ADHESIVE POWER

(71) Applicant: BOSTIK S.A., La Plaine St Denis (FR)

(72) Inventors: Olivier Laferte, Trosly Breuil (FR); Stephane Fouquay, Mont Saint Aignan (FR)

(73) Assignee: BOSTIK S.A., Le Plaine St Denis (FR)

( * ) Notice: Subject to any disclaimer, the term of this patent is extended or adjusted under 35 U.S.C. 154(b) by 0 days.

(21) Appl. No.: 14/521,519

(22) Filed: Oct. 23, 2014

(65) Prior Publication Data
US 2015/0118489 A1 Apr. 30, 2015

(30) Foreign Application Priority Data
Oct. 24, 2013 (FR) ...................... 13 60359

(51) Int. Cl.
| | | |
|---|---|---|
| C09J 175/06 | (2006.01) | |
| C09J 193/04 | (2006.01) | |
| C08G 18/10 | (2006.01) | |
| C08G 18/12 | (2006.01) | |
| C09D 175/04 | (2006.01) | |
| C09D 175/08 | (2006.01) | |
| C08G 18/42 | (2006.01) | |
| C09J 175/04 | (2006.01) | |
| C08L 75/04 | (2006.01) | |
| C08L 75/06 | (2006.01) | |
| C09J 7/02 | (2006.01) | |

(52) U.S. Cl.
CPC ............ *C09J 193/04* (2013.01); *C08G 18/10* (2013.01); *C08G 18/12* (2013.01); *C08G 18/42* (2013.01); *C08G 18/423* (2013.01); *C08G 18/4233* (2013.01); *C08L 75/04* (2013.01); *C08L 75/06* (2013.01); *C09D 175/04* (2013.01); *C09D 175/08* (2013.01); *C09J 7/02* (2013.01); *C09J 7/0203* (2013.01); *C09J 175/04* (2013.01); *C09J 175/06* (2013.01); *C08G 2170/20* (2013.01); *C08G 2170/40* (2013.01); *C09J 2203/334* (2013.01); *C09J 2475/00* (2013.01); *C09J 2493/00* (2013.01); *Y10T 428/2896* (2015.01)

(58) Field of Classification Search
CPC ...... C09J 7/0203; C09J 175/04; C09J 175/06; C09D 175/04; C09D 175/08; C08G 18/4233; C08G 18/42
See application file for complete search history.

(56) References Cited

U.S. PATENT DOCUMENTS

| | | | |
|---|---|---|---|
| 4,468,492 A | 8/1984 | Piccirilli et al. | |
| 8,535,798 B2 | 9/2013 | Poivet et al. | |
| 2008/0292902 A1* | 11/2008 | Reid | C08G 18/12 428/626 |
| 2011/0052912 A1 | 3/2011 | Poivet et al. | |
| 2011/0171465 A1* | 7/2011 | Yasuda | C08G 65/336 428/355 N |
| 2011/0281045 A1 | 11/2011 | Goubard et al. | |
| 2012/0160413 A1* | 6/2012 | Laferte | C08G 18/10 156/331.7 |

FOREIGN PATENT DOCUMENTS

| | | | | |
|---|---|---|---|---|
| EP | 2390299 A1 | 11/2011 | | |
| EP | 2468783 A1 | 6/2012 | | |
| FR | WO 2013136108 A1 * | 9/2013 | ............ | A61L 15/58 |
| WO | WO-2008067967 * | 6/2008 | ............ | C08G 18/42 |

OTHER PUBLICATIONS

Search Report and Written Opinion from priority Patent Application No. FR 13/60359 dated May 14, 2014.

* cited by examiner

*Primary Examiner* — Michael L Leonard
(74) *Attorney, Agent, or Firm* — Millen, White, Zelano and Branigan, P.C.

(57) ABSTRACT

Heat-curable adhesive composition:
(a) a polyurethane composition (A) of formula:

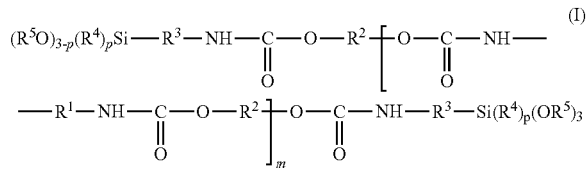

(i)
in which $R^1$ is a hydrocarbon-based radical; $R^2$ is a polyester block; $R^3$ is a linear C1-C3 alkylene radical; $R^4$ and $R^5$ are a C1-C4 alkyl; m is an integer such that the molar mass of the said polyurethanes is 900-27 000 Da; p=0, 1 or 2;

obtained by producing polyester diols by polycondensation of:
 (i) dimerized fatty acids with an acid number of 190-200 mg KOH/g with a C2-C44 diol optionally having O or S; or
 (ii) dimerized fatty alcohols with a hydroxyl number of 200-220 mg KOH/g with a C4-C44 dicarboxylic acid optionally having O or S;
(b) 22-62% of a compatible tackifying resin (B); and
(c) 0.01-3% of a crosslinking catalyst (C). Self-adhesive support obtained by preheating the adhesive composition, coating onto a support layer and then curing. Manufacture of self-adhesive labels and/or tapes.

21 Claims, No Drawings

PSA OF RENEWABLE ORIGIN WITH TEMPERATURE-STABLE ADHESIVE POWER

The present invention relates to a heat-curable adhesive composition comprising polymers bearing hydrolysable alkoxysilane end groups, which may be obtained, at least partly, from starting materials of renewable origin. This composition makes it possible, after coating, to obtain a self-adhesive support whose adhesive power is maintained over a wide temperature range. The invention also relates to the said self-adhesive support, and also to its use for manufacturing self-adhesive labels and/or tapes.

Patent applications WO 09/106 699 and EP 2 336 208 have already disclosed adhesive compositions based on polyurethane (or polyether) bearing hydrolysable alkoxysilane end groups, the coating of which onto a support and heating lead, after a chemical crosslinking reaction performed in the presence of atmospheric moisture, to the production of a self-adhesive support which has advantageous properties of adhesive power and of immediate tack power. As a result of these properties, the said self-adhesive support may be used for manufacturing self-adhesive labels and/or tapes.

The adhesive seal that fixes the said self-adhesive support onto a substrate is thus formed by this crosslinking reaction. As a result, it covers a three-dimensional polymeric network structure comprising siloxane bonds and also has the advantage of conserving the required adhesive power over a wide temperature range. This makes it possible to envisage the use of the said self-adhesive support in any application in which an article coated with the label and/or tape is exposed to very variable temperatures, including those very far from room temperature. Examples that may be mentioned include the placing of labels onto certain parts of motor vehicles (or other vehicles) located close to the engine, or onto wrappings designed to receive during their packaging a hot liquid, or alternatively onto articles (such as tyres) that are labelled while hot, on leaving the manufacturing lines. Mention may also be made of the use of self-adhesive tapes for assembling parts for which good heat resistance is necessary, as in the case, for example, of the interior trim of aircraft or other vehicles.

The composition disclosed by patent application WO 09/106 699 comprises from 20% to 85% of a polyurethane with two hydrolysable alkoxysilane end groups, the production process of which comprises the reaction of a diisocyanate with a polyether diol, more particularly a polyoxyalkylene diol, such as polypropylene glycol.

However, polyoxyalkylene diols are manufactured by polymerization of alkylene oxides, which are themselves obtained solely from starting materials of non-renewable origin, especially from ethylene and propylene derived from the vapour cracking of naphtha or natural gas.

The composition disclosed by patent application EP 2 336 208, which comprises from 20% to 85% of a polyether with two hydrolysable alkoxysilane end groups, is also obtained from a polyoxyalkylene diol and thus has the same drawback as the composition disclosed by patent application WO 09/106 699.

Now, in the current context of the development of "green" chemistry for manufacturing adhesive compositions, it is increasingly sought to avoid the use of non-renewable starting materials (of petroleum or fossil origin), or at the very least to reduce their weight proportion in the said compositions. It is thus rather sought to use, for the manufacture of the said composition, renewable starting materials, of plant or animal origin.

The aim of the invention is to propose heat-curable adhesive compositions which offer properties similar to those of the compositions known from the prior art, while at the same time replacing, at least partly, the polymers bearing hydrolysable alkoxysilane end groups used in the said compositions, with polymers bearing hydrolysable alkoxysilane end groups that may be manufactured from renewable starting materials.

The subject of the present invention is thus, firstly, a heat-curable adhesive composition comprising:

(a) from 35% to 75% weight/weight of a composition (A) comprising at least 90% weight/weight of polyurethanes bearing hydrolysable alkoxysilane end groups of formula (I):

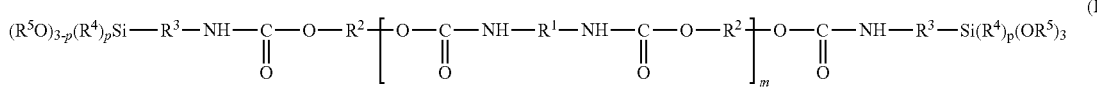

in which:
R$^1$ represents a divalent hydrocarbon-based radical comprising from 5 to 15 carbon atoms which may be aromatic or aliphatic, and linear, branched or cyclic;
R$^2$ represents a divalent polyester block which is derived from a polyester diol of formula R$^2$(OH)$_2$ by replacing each of the two hydroxyl groups with a free valency;
R$^3$ represents a linear divalent alkylene radical comprising from 1 to 3 carbon atoms;
R$^4$ and R$^5$, which may be identical or different, each represent a linear or branched alkyl radical of 1 to 4 carbon atoms, with the possibility when there are several radicals R$^4$ (or R$^5$) of them being identical or different;
m is an integer such that the number-average molar mass of the polyurethanes of formula (I) is between 900 Da and 27 kDa;
p is an integer equal to 0, 1 or 2;
the said composition (A) also being obtained via a process which comprises a step of preparing a composition (A-1) of polyester diols of formula R$^2$(OH)$_2$ by reacting via a polycondensation reaction:

(i) one or more dimerized fatty acids included in a composition (A-1-1) with an acid number $I_A$ of between 190 and 200 mg KOH/g with one or more diols comprising from 2 to 44 carbon atoms and optionally one or more heteroatoms chosen from oxygen and sulfur; or (ii) one or more dimerized fatty alcohols included in a composition (A-1-2) with a hydroxyl number $I_{OH}$ of between 200 and 220 mg KOH/g with one or more dicarboxylic acids comprising from 4 to 44 carbon atoms and optionally one or more heteroatoms chosen from oxygen and sulfur;

such that the said composition (A-1) has a hydroxyl number $I_{OH}$ of between 15 and 35 mg KOH/g and a Brookfield viscosity measured at 80° C. of less than 10 Pa·s;

(b) from 22% to 62% weight/weight of a compatible tackifying resin (B) with a number-average molar mass of between 200 Da and 10 kDa; and (c) from 0.01% to 3% weight/weight of a crosslinking catalyst (C).

The adhesive composition according to the invention may, very advantageously, be prepared from starting materials, some of which, especially the dimerized fatty acids or the dimerized fatty alcohols used for the manufacture of composition (A), are of natural and renewable origin. Furthermore, the said adhesive composition leads, after coating onto a support and curing, to the formation of a self-adhesive support which has adhesive and tack power properties of the same level as those obtained with the adhesive compositions taught by patent applications WO 09/106 699 and EP 2 336 208.

In the present text:

the number-average molar masses indicated for the polymers are determined by gel permeation chromatography in THF (or GPC, also known as size exclusion chromatography or SEC), with calibration relative to a polystyrene standard of certified external molecular weight;

the Brookfield viscosities indicated are measured according to standard DIN ISO 2555 with a Brookfield RTV viscometer, optionally equipped (depending on the measuring temperature) with a Thermosel system.

1. Composition (A) of Polyurethanes of Formula (I):

The radicals and groups defined previously in the general formula (I) keep the same meaning in the present description, unless otherwise indicated.

Composition (A) of polyurethanes bearing alkoxysilane end groups of formula (I) may be prepared according to a process in three sequential steps.

1$^{st}$ Step: Preparation of a Composition (A-1) with a Hydroxyl Number $I_{OH}$ of Between 15 and 35 KOH/g and Comprising at Least 90% Weight/Weight of Polyester Diols of Formula $R^2(OH)_2$:

Variant (i): Polyester Diols of Formula $R^2(OH)_2$ Obtained According to Process (i):

According to this first variant, the following are thus reacted via a polycondensation reaction:

one or more dimerized fatty acids included in a composition (A-1-1) with an acid number $I_A$ of between 190 and 200 mg KOH/g, with one or more diols comprising from 2 to 44 carbon atoms and optionally one or more heteroatoms chosen from oxygen and sulfur.

Description of the Dimerized Fatty Acids:

The said dimerized fatty acids are included in a proportion of at least 92% weight/weight and preferably at least 95%, in composition (A-1-1) and are reacted with a stoichiometric excess of the said diols.

The said dimerized fatty acids included in composition (A-1-1) are also known to those skilled in the art under the name "dimerized fatty acids" or "fatty acid dimers". The said acids denote the products of dimerization of monounsaturated or polyunsaturated fatty acids comprising from one to three double bonds and/or the corresponding esters.

The preferred dimerized fatty acids are obtained from C6 to C22, preferably C10 to C22 and more particularly C14 to C22 fatty acids rich in unsaturated C18 alkyl chains.

Examples that may be mentioned include the products of dimerization:

of oleic acid, linoleic acid, linolenic acid, palmitoleic acid or elaidic acid;

of mixtures of unsaturated fatty acids obtained by hydrolysis of fats and of natural oils such as sunflower oil, soybean oil, olive oil, rapeseed oil, linseed oil, palm oil, cottonseed oil, jojoba oil, corn oil, pine oil, grapeseed oil and tall oil which is a by-product of the manufacture of paper pulp;

and also the corresponding saturated dimerized fatty acids, obtained by hydrogenation using a nickel catalyst.

These unsaturated fatty acids are extracted from these natural products, for example in methyl ester form by transesterification with methanol of the corresponding triglycerides, followed by saponification of the corresponding methyl esters.

The unsaturated fatty acids thus obtained as a mixture are then oligomerized by heating via a condensation reaction on the double bonds, which leads to the formation of technical mixtures containing about 25% of monocarboxylic acids (acid monomers) often isomerized relative to the starting acids, 70% of dicarboxylic acids (acid dimers) with twice the number of carbons relative to the starting acids, and 5% of tricarboxylic acids (acid trimers) having three times the number of carbons relative to the starting acids. By purification of this mixture, the various commercial grades of acid dimers, monomers or trimers are obtained, which may exist in hydrogenated or non-hydrogenated form.

The fatty acid dimers are isolated by distillation of the latter mixtures, to form dimers bearing two carboxylic functions (dicarboxylic acids) present in a proportion of at least 92% weight/weight and preferably at least 95%, in a composition that may be used as composition (A-1-1) for the preparation of composition (A-1) of polyester diols, in accordance with variant (i) of the first step of the process for obtaining composition (A).

The following formulae are given as illustrations of a few dimerized fatty acids:

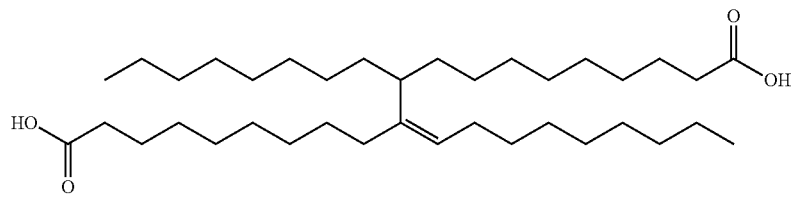

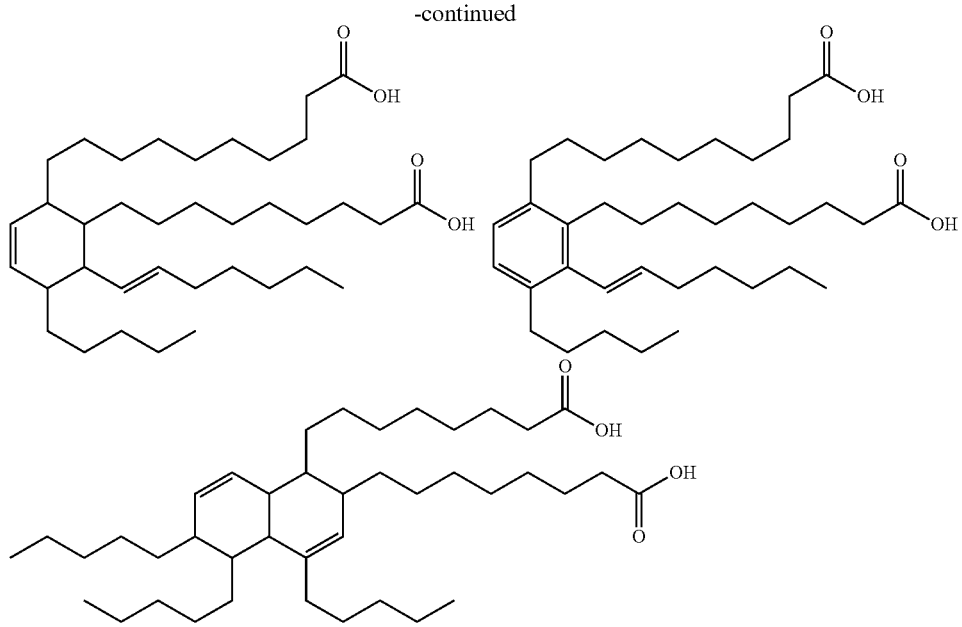

Numerous compositions of such dimerized fatty acids are commercially available, among which mention may be made of the products of the Pripol® range, distributed by the company Croda, and especially Pripol® 1013 which is a composition comprising from 95% to 98% of dimerized fatty acids with an acid number $I_A$ of between 194 and 198 mg KOH/g. The latter composition is more particularly preferred.

The acid number $I_A$ is the number of carboxylic functions per gram of dimerized fatty acids of (A1-1), the said number being expressed in the form of an equivalent of milligrams of KOH necessary to neutralize the acidity of 1 gram of fatty substance, determined by titrimetry. The said number is linked to the number-average molar mass M by the relationship:

$$I_A = 56.1 \times 2000/M$$

Description of the Diols:

The diol(s) used may be aromatic or aliphatic, saturated or unsaturated, and linear, branched or alicyclic.

They are chosen, for example, from the following compounds: ethylene glycol, diethylene glycol, triethylene glycol, tetraethylene glycol, 1,2-propanediol, dipropylene glycol, tripropylene glycol, tetrapropylene glycol, polypropylene glycol of molar mass 400 g/mol, tetramethylene glycol, polytetramethylene glycol, 1,3-propanediol, 2-butyl-2-ethyl-1,3-propanediol, 2-methyl-1,3-propanediol, 2,2-dimethyl-1,3-propanediol, 2-ethyl-1,3-propanediol, 1,2-butanediol, 1,4-butanediol, 1,5-pentanediol, 2-methyl-1,5-pentanediol, 3-methyl-1,5-pentanediol, 1,4-hexanediol, 1,6-hexanediol, 1,10-decanediol, cyclohexanedimethanol, 1,6-hexanediol, neopentyl glycol, 1,9-nonanediol, 1,10-decanediol, 2,2,4,4-tetramethyl-1,3-cyclo-butanediol, 1,4-cyclohexanediol, hydrogenated bisphenol-A, hydrogenated bisphenol-F, dicidols (mixture of isomers of 3,8-bis(hydroxymethyl)tricyclo[5.2.1.0]decane, 4,8-bis(hydroxymethyl)-tricyclo[5.2.1.0]decane and 5,8-(bis-hydroxymethyl) tricyclo[5.2.1.0]decane), polycarbonate diols, and fatty alcohol dimers containing from 28 to 44 carbon atoms.

According to an alternative of this variant (i), composition (A-1-1) of dimerized fatty acids may be first converted into the corresponding chloride composition via the action of phosphorus trichloride ($PCl_3$), in accordance with the process described in international patent application WO 01/04080. It is this dimerized fatty acid chloride composition that is then reacted with the abovementioned diols to form composition (A-1) of polyester diols of formula $R^2(OH)_2$.

Variant (ii): Polyester Diols of Formula $R^2(OH)_2$ Obtained According to Process (ii):

According to this second variant, the following are thus reacted via a polycondensation reaction:
  one or more dimerized fatty alcohols included in a composition (A-1-2) with a hydroxyl number $I_{OH}$ of between 200 and 220 mg KOH/g, with
  one (or more) dicarboxylic acids comprising from 4 to 44 carbon atoms and optionally one or more heteroatoms chosen from oxygen and sulfur.

Description of the Dimerized Fatty Alcohols:

The said dimerized fatty alcohols are included in a proportion of at least 92% weight/weight and preferably at least 95% in composition (A-1-2) and are reacted in stoichiometric excess with the said acids.

These dimerized fatty alcohols are obtained from the fatty acid dimers in methyl diester form which were described previously, via a catalytic hydrogenation. This hydrogenation leads to the reduction of the two ester functions to two —OH functions. These dimerized fatty alcohols are thus obtained in the form of a composition in which they constitute at least 92% weight/weight (preferably at least 95%), and which may be used as composition (A-1-2) for performing variant (ii) of this first step.

Compositions of such dimerized fatty alcohols are also commercially available, for instance Pripol® 2033 which is a composition comprising at least 96% of aliphatic dimerized fatty alcohols with an $I_{OH}$ number of between 202 and 212 mg KOH/g. This composition is more particularly preferred.

The hydroxyl number $I_{OH}$ is the number of hydroxyl functions per gram of dimerized fatty alcohols of (A-1-2), the said number being expressed in the form of the equivalent in milligrams of KOH used in the assay of the hydroxyl functions, determined by titrimetry.

The said number is linked to the number-average molar mass M via the relationship:

$$I_{OH} = 56.1 \times 2000/M$$

Description of the Diacids:

The dicarboxylic acid(s) used may be aromatic or aliphatic, saturated or unsaturated, and linear, branched or alicyclic.

They are chosen, for example, from:

unsaturated dicarboxylic acids, for instance citraconic acid, fumaric acid, itaconic acid, maleic acid or mesaconic acid;

aromatic dicarboxylic acids such as phthalic acid, isophthalic acid or terephthalic acid;

aliphatic or cycloaliphatic dicarboxylic acids such as 1,3- or 1,4-cyclohexanedicarboxylic acid, adipic acid, glutaric acid, succinic acid, fumaric acid, sebacic acid, 3-methyl-1,5-pentanedicarboxylic acid, 1,10-decanedicarboxylic acid, 1,12-dodecanedicarboxylic acid, fatty acid dimers containing from 28 to 44 carbon atoms, 1,18-octadecanedicarboxylic acid, methyltetrahydrophthalic acid, hexahydrophthalic acid, tetrahydrophthalic acid or azelaic acid.

In this step for preparing composition (A-1) of polyester diols of formula $R^2(OH)_2$, the following are reacted, according to the variant concerned:

for variant (i): the dimerized fatty acids of composition (A-1-1) with a stoichiometric excess of one (or more) diol, or for variant (ii): one (or more) dicarboxylic diacid with a stoichiometric excess of the dimerized fatty alcohols of composition (A-1-2).

This means that the weight amounts of the two reagents used (for each of the two variants) correspond to an excess of the equivalent number of moles of —OH functions relative to the equivalent number of moles of —COOH groups.

More precisely, the weight amounts of the reagents to be placed in the reactor are determined on the basis of the ratio ρ equivalent number of moles of —OH functions/equivalent number of moles of —COOH functions.

This ratio ρ is defined as being equal:

for the first variant: to the equivalent total number of moles of —OH functions present in the diol(s), divided by the equivalent total number of moles of —COOH functions present in the composition of dimerized fatty acids (A-1-1) determined from the weight of the said composition and from its acid number $I_A$;

for the second variant: to the equivalent total number of moles of —OH functions present in the dimerized fatty alcohol composition (A-1-2) determined from the weight of the said composition and from its hydroxyl number $I_{OH}$, divided by the equivalent number of —COOH functions present in the dicarboxylic acid(s).

The nature of the diol(s) for variant (i), or of the dicarboxylic acid(s) for variant (ii), and also the value of the ratio ρ are chosen such that the composition (A-1) of polyester diols of formula $R^2(OH)_2$ has:

a hydroxyl number $I_{OH}$ of between 15 and 35 mg KOH/g and preferably between 16 and 25 mg KOH/g, and a Brookfield viscosity measured at 80° C. of less than 10 Pa·s and preferably less than 6 Pa·s.

The said viscosity is measured with a Brookfield viscometer equipped with the Thermosel system for taking high-temperature viscosity measurements, equipped with an A27 needle rotating at a speed suited to the sensitivity of the sensor (on average 10 rpm).

The value of the ratio ρ is generally between 1.08 and 1.41 and preferably between 1.08 and 1.28.

The unreacted dimerized fatty alcohols or diols are, where appropriate, partially removed by distillation, and a composition (A-1) comprising at least 90% weight/weight and preferably at least 95% weight/weight of polyester diols of formula $R^2(OH)_2$ is thus obtained.

$2^{nd}$ Step: Preparation of a Composition (A-2) Comprising at Least 90% Weight/Weight of Polyurethanes Bearing Hydroxyl End Groups:

Composition (A-1) comprising the polyester diols obtained previously is treated with the diisocyanate of formula (II):

$$NCO—R^1—NCO \quad (II)$$

in amounts corresponding to a ratio of the molar equivalent of the number of NCO/OH functions of between 0.3 and 0.7 and preferably equal to about 0.5;

so as to obtain the polyurethanes bearing hydroxyl end groups of formula (III):

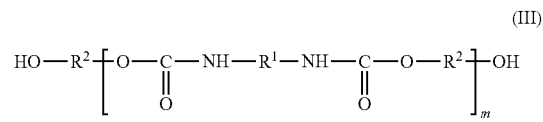

in which, preferably, m is less than or equal to 10.

However, after this second step, unreacted polyester diols of formula $R^2(OH)_2$, also remain, such that composition (A-2) also comprises a residual amount of the said polyester diols.

The polyurethanes bearing hydroxyl end groups of formula (III) are included in composition (A-2) in a proportion of at least 90% weight/weight and preferably at least 95% weight/weight.

According to a preferred variant, the radical $R^1$ is chosen from one of the following divalent radicals, of which the formulae below reveal the two free valencies:

a) the divalent radical derived from isophorone:

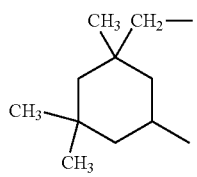

b)

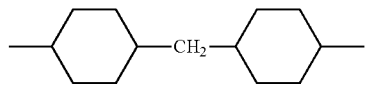

c)

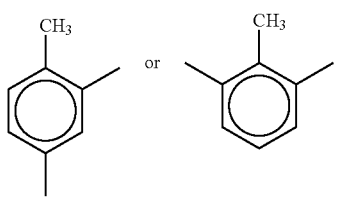

d)

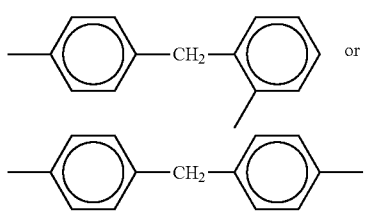

e) —(CH$_2$)$_6$— (or hexamethylene radical).

According to a most particularly preferred variant, R$^1$ is the divalent radical derived from isophorone:

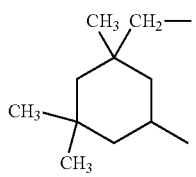

3rd Step: Production of Composition (A) Comprising at Least 90% Weight/Weight of Polyurethanes Bearing Alkoxysilane End Groups of Formula (I):

Composition (A-2) of polyurethanes bearing hydroxyl end groups obtained in the 2$^{nd}$ step is treated with the isocyanatosilane of formula (IV):

$$NCO—R^3—Si(R^4)_p(OR^5)_{3-p} \quad (IV)$$

in an amount corresponding to a ratio of the molar equivalent of NCO/OH functions of between 0.90 and 1.05 and preferably equal to about 1.

The polyurethanes bearing alkoxysilane end groups of formula (I) included in a proportion of at least 90% weight/weight in composition (A) and preferably in a proportion of at least 95% weight/weight are thus obtained.

According to a preferred variant, in formula (I), m is less than or equal to 10.

According to another preferred variant:
R$^3$ is the methylene or n-propylene divalent radical;
R$^4$ and R$^5$ each represent a methyl or ethyl radical; and/or
p equals 0 or 1.

According to an even more preferred variant:
R$^3$ is the n-propylene radical, and
the group Si(R$^4$)$_p$(OR$^5$)$_{3-p}$ is the trimethoxysilyl radical.

These preferred variants are obtained by using the isocyanatosilane having the appropriate formula (IV).

The second and third steps of the process that have just been described are performed under anhydrous conditions, so as to avoid hydrolysis of the alkoxysilane groups. A typical temperature range for performing these reaction steps is from 30° C. to 120° C. and more particularly from 60 to 105° C. The second step of the process is advantageously performed in the presence of an organometallic catalyst.

2. Compatible Tackifying Resin (B):

As regards the tackifying resin(s) (B) that are included in the composition according to the invention, the term "compatible tackifying resin" is intended to denote a tackifying resin which, when mixed in 50%/50% proportions with composition (A), gives a substantially homogeneous mixture.

The resins (B) are advantageously chosen from:
(i) the resins obtained by polymerization of terpene hydrocarbons and of phenols, in the presence of Friedel-Crafts catalysts;
(ii) the resins obtained via a process comprising the polymerization of α-methylstyrene, the said process also possibly comprising a reaction with phenols;
(iii) rosins of natural or modified origin (for instance rosin extracted from pine gum, wood rosin extracted from tree roots) and hydrogenated, dimerized or polymerized derivatives thereof or derivatives esterified with monoalcohols or polyols (such as glycerol);
(iv) the resins obtained by hydrogenation, polymerization or copolymerization (with an aromatic hydrocarbon) of mixtures of unsaturated aliphatic hydrocarbons containing about 5, 9 or 10 carbon atoms derived from petroleum fractions;
(v) terpenic resins, generally resulting from the polymerization of terpenic hydrocarbons, for instance monoterpene (or pinene) in the presence of Friedel-Crafts catalysts;
(vi) copolymers based on natural terpenes, for example styrene/terpene, α-methylstyrene/terpene and vinyltoluene/terpene; or
(vii) acrylic resins with a viscosity at 100° C. of less than 100 Pa·s.

According to a particularly preferred variant of the adhesive composition according to the invention, a resin of type (iii) or of type (v) is used as resin (B). An example of a commercially available resin of type (iii) that may be given is Dertoline® G2L from the company DRT, which is a rosin esterified with glycerol.

3. Crosslinking Catalyst (C):

The crosslinking catalyst (C) that may be used in the composition according to the invention may be any catalyst known to a person skilled in the art for silanol condensation.

Examples of such catalysts that may be mentioned include organotitanium derivatives such as titanium acetylacetonate (commercially available under the name Tyzor® AA75 from the company DuPont), organoaluminium derivatives such as aluminium chelate (commercially available under the name K-Kat® 5218 from the company King Industries) and amines such as 1,8-diazobicyclo(5.4.0)undec-7-ene or DBU.

The hot-curable adhesive composition according to the invention preferably comprises:
(a) from 40% to 65% weight/weight of composition (A) of polyurethanes bearing hydrolysable alkoxysilane end groups,
(b) from 33% to 58% weight/weight of tackifying resin (B), and
(c) from 0.45% to 2.5% weight/weight of crosslinking catalyst (C).

This variant makes it possible to obtain advantageous properties for the adhesive seal combined with a high weight proportion of ingredients of renewable origin.

4. Other Ingredients of the Composition According to the Invention:

The composition according to the invention may include up to 15% weight/weight of a polymer of formula (V):

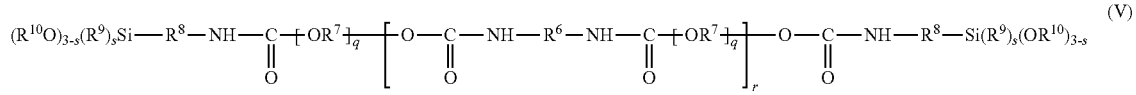

in which:
- $R^6$ represents a divalent hydrocarbon-based radical comprising from 5 to 15 carbon atoms, which may be aromatic or aliphatic, and linear, branched or cyclic;
- $R^7$ represents a linear or branched divalent alkylene radical comprising from 1 to 4 carbon atoms;
- $R^8$ represents a linear divalent alkylene radical comprising from 1 to 3 carbon atoms;
- $R^9$ and $R^{10}$, which may be identical or different, each represent a linear or branched alkyl radical of 1 to 4 carbon atoms, with the possibility, when there are several radicals $R^9$ (or $R^{10}$), of them being identical or different;
- q is an integer such that the number-average molar mass of a polyether block of formula $—[OR^7]_q—$ is between 300 Da and 30 kDa;
- r is either equal to zero or to a non-zero integer such that the number-average molar mass of the polymer of formula (V) is between 600 Da and 60 kDa;
- s is an integer equal to 0, 1 or 2.

The polymer of formula (V) may be prepared according to the process described in patent application EP 2 336 208 or WO 2009/106 699 depending on whether it is, respectively, a polyether (in the case where r equals 0) or a polyurethane (in the case where r represents a non-zero integer).

Preferably, the polymer is a polyether, corresponding to formula (V) in which r equals 0. According to a further preferred variant, the polyether(s) of formula (V) has one and/or other of the following characteristics:
- $R^7$ is chosen from the divalent radicals: ethylene, isopropylene, n-propylene, n-butylene, ethylethylene;
- $R^8$ is the methylene or n-propylene radical;
- $R^9$ and $R^{10}$, which may be identical or different, each represent a methyl or ethyl radical.

According to an even further preferred variant, the polyether(s) of formula (V) is such that:
- $R^7$ is the isopropylene radical;
- $R^8$ is the methylene radical;
- s=0 or 1; and
- $R^9$ and $R^{10}$ each represent a methyl radical.

Certain polyethers of formula (V) are commercially available, such as Genosil® STP-E30, available from the company Wacker. This polymer is a polyether of formula (V) in which r equals 0, s equals 1, $R^7$ is the isopropylene radical, $R^8$ is the methylene radical and $R^9$ and $R^{10}$ represents a methyl radical. This polyether has a viscosity (measured at 23° C.) of 30 Pa·s and a number-average molecular mass of 38 kDa.

According to another preferred variant, the polyether of formula (V) is such that its number-average molar mass ranges from 30 to 40 kDa and its viscosity, measured at 23° C., ranges from 30 to 37 Pa·s.

According to a variant that is also advantageous, the polyether of formula (V) has a polydispersity index ranging from 1 to 2. The polydispersity index is the ratio of the weight-average molecular mass to the number-average molecular mass. In this case, the polyether of formula (V) in which r equals 0 may be prepared from a polyether diol of formula $H—[OR^7]_q—OH$ which itself has a polydispersity index ranging from 1 to 2. The latter polyether diol may be obtained, in a known manner, by polymerization of the corresponding alkylene oxide in the presence of a catalyst based on a metal cyanide double complex. Corresponding commercial products are also available under the name Acclaim® from the company Bayer.

Optionally, the composition according to the invention may also include thermoplastic polymers often used in the preparation of HMPSAs, such as ethylene-vinyl acetate (EVA) or styrene block copolymers.

The heat-curable adhesive composition according to the invention may also comprise up to 3% of a hydrolysable alkoxysilane derivative, as desiccant, and preferably a trimethoxysilane derivative. Such an agent advantageously prolongs the shelf life of the composition according to the invention during storage and transportation, before its use. An example that may be mentioned is gamma-methacryloxypropyltrimethoxysilane sold under the trade name Silquest® A-174 from the company US Momentive Performance Materials Inc.

The composition according to the invention may also include a plasticizer such as a phthalate or a benzoate, a paraffinic and naphthenic oil (such as Primol® 352 from the company Esso) or a wax of a polyethylene homopolymer (such as A-C® 617 from Honeywell), or a wax of a copolymer of polyethylene and of vinyl acetate, or alternatively pigments, dyes or fillers.

Finally, an amount of from 0.1% to 2% of one or more stabilizers (or antioxidants) is preferably included in the composition according to the invention. These compounds are introduced to protect the composition from degradation resulting from a reaction with oxygen that is liable to be formed by the action of heat or light. These compounds may include antioxidants that trap free radicals, for instance Irganox® 245 and Irganox® 1010. These antioxidants may be used alone or in combination with other antioxidants or UV stabilizers.

5. Preparation of the Composition According to the Invention:

The heat-curable adhesive composition according to the invention may be prepared via a process which comprises:
- a step of mixing protected from air, preferably under an inert atmosphere, the composition (A) of polyurethanes of formula (I) with the polymer of formula (V) (where appropriate) and the tackifying resin(s) (B), at a temperature of between 50 and 170° C. and preferably between 100 and 170° C., and then
- a step of cooling the said mixture to a temperature ranging from 50 to 90° C. and advantageously about 70° C., and then
- a step of incorporating into the said mixture catalyst (C) and, where appropriate, the desiccant and the other optional components.

A composition whose Brookfield viscosity, measured at 100° C., is between 9 and 100 Pa·s, making it suitable for coating onto a support layer, is thus advantageously obtained. The said viscosity is measured, according to standard DIN ISO 2555, with a Brookfield RTV viscometer equipped with a Thermosel system for high-temperature viscosity measurements, equipped with an A27 needle rotating at a speed suited to the sensitivity of the sensor (on average 10 rpm).

A subject of the present invention is also a self-adhesive support that may be obtained via the process comprising:
  (a) preheating to a temperature of between 50 and 130° C. of the adhesive composition as defined previously, and then
  (b) coating it on a support layer, and then
  (c) curing it, by heating the support thus coated to a temperature of between 50 and 150° C.

Step (b) of coating the support layer is performed using known coating devices, for instance a lip nozzle or a nozzle of curtain type, or alternatively a roller. It uses a basis weight of adhesive composition ranging from 3 to 500 g/m$^2$ and preferably from 10 to 250 g/m$^2$. The material that may be used for the support layer is, for example, paper or a film of a polymer material with one or more layers.

The time required for the curing of step (c) may vary within wide ranges, for example between 1 second and 10 minutes, depending on the basis weight of the adhesive composition deposited on the support layer, the heating temperature and the relative humidity.

This thermal curing step has the effect of creating—between the polymer chains bearing hydrolysable alkoxysilane end groups of composition (A) and under the action of atmospheric moisture—bonds of siloxane type which lead to the formation of a three-dimensional polymer network. The adhesive composition thus cured is a pressure-sensitive adhesive which gives the support layer that is coated therewith the desirable adhesive power and tack power.

Thus, a polyethylene terephthalate (PET) support 50 μm thick, coated with a basis weight of 50 g/m$^2$, shows permanent adhesion to a stainless-steel substrate corresponding to an adhesive power (measured via the peel test at 180° on stainless steel described below) advantageously between 1 and 10 N/cm. The tack of this same support at room temperature (measured via the instantaneous adhesion test of the loop described below) is advantageously between 1 and 10 N/cm$^2$.

Finally, the adhesive seal formed after application to a substrate of the support layer coated with the cured composition ensures the fixing of the said support layer within a temperature range from −60° C. to +200° C.

The self-adhesive support according to the invention may also comprise a protective non-stick layer covering the layer of PSA and applied (or laminated) thereon by simple pressure.

The present invention also relates to the use of the self-adhesive support defined previously for the manufacture of one-sided or two-sided self-adhesive labels and/or tapes.

The basis weight of heat-curable adhesive composition necessary for the manufacture of self-adhesive labels may range from 10 to 100 g/m$^2$ and preferably from 20 to 50 g/m$^2$. The basis weight necessary for the manufacture of self-adhesive labels may vary within a much wider range from 3 to 500 g/m$^2$ and preferably from 15 to 250 g/m$^2$ per face.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French Application No. FR 13/60359, filed Oct. 24, 2013 are incorporated by reference herein.

The examples that follow are given for purely illustrative purposes of the invention and cannot be interpreted as limiting the scope thereof.

EXAMPLE A (REFERENCE)

Preparation of a Composition (A) Comprising at Least 90% Weight/Weight of Polyurethanes Bearing Hydrolysable Alkoxysilane End Groups of Formula (I), Obtained from Tripropylene Glycol and from a Dimerized Fatty Acid Chloride Composition Prepared from Pripol® 1013

1st Step:

Preparation (According to Variant (i)) of a Composition (A-1) with a Hydroxyl Number $I_{OH}$ Equal to 18 mg KOH/g and Comprising at Least 90% Weight/Weight of Polyester Diols Obtained by Condensation of Tripropylene Glycol and of Dimerized Fatty Acid Chlorides Derived from Pripol® 1013:

572 g (1 mol) of the fatty acid dimer composition Pripol® 1013 with an acid number of 196 mg KOH/g are placed in a jacketed 2 liter reactor equipped with a stirrer, a heating means, a thermometer, a condenser and connected to a vacuum pump, and the system is brought to 85° C. under a reduced pressure of 20 mbar with a stream of nitrogen over 1 hour in order to dehydrate it.

The fatty acid dimer composition, dehydrated and cooled to 40° C. beforehand, is diluted in 500 ml of dichloromethane and 250 g of thionyl chloride (2.10 mol) are then added at room temperature (23° C.). After stirring for 2 hours at room temperature, the dichloromethane and the excess thionyl chloride are removed by distillation under a reduced pressure of 20 mbar.

600 g of a dimerized fatty acid chloride composition with an acid number of 196 mg KOH/g are obtained.

542 g (0.89 mol) of this dimeric fatty acid chloride composition and 192.3 g (1.00 mol) of tripropylene glycol ($I_{OH}$ of 584 mg KOH/g) are placed in a jacketed 1 liter reactor. The reaction medium is then brought to 120° C. under cover of nitrogen, with mechanical stirring and under a partial vacuum of 10 mbar to remove the HCl formed. The condensation reaction is continued for about 6 hours until the reaction of the acid chloride composition is complete.

Once the reaction is complete, the reaction medium is cooled to about 85° C., the residual acidity is neutralized with sodium bicarbonate and the medium is then filtered.

672 g of a composition with a hydroxyl number $I_{OH}$ equal to 18 mg KOH/g, a Brookfield viscosity measured at 80° C. of 4295 mPa·s and comprising at least 90% weight/weight of polyester diols are obtained.

The proportion of starting materials of renewable origin in composition (A-1) thus obtained is 74% weight/weight.

2nd Step:

Preparation of a Composition (A-2) Comprising at Least 90% Weight/Weight of Polyurethanes Bearing Hydroxyl End Groups of Formula (III):

190.14 g of the composition obtained in the first step (containing a total equivalent number of —OH functions equal to 61 mmol) are placed in a closed 250 ml reactor equipped with a stirrer, heating means and a thermometer, and connected to a vacuum pump. The system is heated to 85° C. and maintained at a reduced pressure of 20 mbar for 1 hour to dehydrate the polyester polyols.

The following are then introduced into the reactor maintained at atmospheric pressure and brought to a temperature of 90° C.:

- 20 mg of a bismuth/zinc carboxylate catalyst (Borchi® Kat VP0244 from the company Borchers GmbH), and
- 3.4 g of isophorone diisocyanate (or IPDI, with a titre of 37.6% weight/weight of —NCO group), containing 30.52 mmol of —NCO functions.

The amounts introduced thus correspond to an NCO/OH mole ratio equal to 0.5.

The polyaddition reaction is continued for 3 hours until consumption of the —NCO functions of the isophorone diisocyanate is complete (detected by the disappearance of the —NCO band on infrared analysis).

193.56 g of a composition (A2-2) with a content of —OH functions of 0.158 mmol/g and comprising at least 90% of polyurethanes bearing hydroxyl end groups are obtained.

The proportion of starting materials of renewable origin in composition (A-2) thus obtained is 72.7% weight/weight.

3rd Step:

Production of Composition (A) Comprising at Least 90% Weight/Weight of Polyurethanes Bearing Hydrolysable Alkoxysilane End Groups of Formula (I):

6.45 g of gamma-isocyanato-n-propyltrimethoxysilane (with a titre of 19.9% weight/weight of —NCO groups), i.e. 30.58 mmol of NCO corresponding to an NCO/OH ratio equal to 1, are placed in the reactor of the second step.

The reactor is then maintained under an inert atmosphere at 100° C. for 1.5 hours until reaction is complete (detected by the disappearance of the —NCO band on infrared analysis).

200.01 g of a composition that is viscous at room temperature, with a viscosity at 100° C. of 16 850 mPa·s (measured with a Brookfield viscometer with a No. 27 needle rotating at a rate of 20 rpm) comprising at least 90% weight/weight of polyurethanes bearing hydrolysable alkoxysilane end groups of formula (I) are obtained.

The weight proportion of this composition that is obtained from renewable starting materials is 70.3% weight/weight.

EXAMPLE B (REFERENCE)

Preparation of a Composition (A) Comprising at Least 90% Weight/Weight of Polyurethanes Bearing Hydrolysable Alkoxysilane End Groups of Formula (I), Obtained from 3-Methyl-1,5-Pentanediol and from a Dimerized Fatty Acid Chloride Composition Prepared from Pripol® 1013

The first step of Example A is repeated with 118.2 g (1.00 mol) of 3-methyl-1,5-pentanediol ($I_{OH}$ of 950 mg KOH/g) and 537 g (0.88 mol) of the dimerized fatty acid chloride composition with an acid number of 196 mg KOH/g.

594 g of a composition (A-1) with a hydroxyl number $I_{OH}$ equal to 22.5 mg KOH/g, a Brookfield viscosity measured at 80° C. of 5536 mPa·s and comprising at least 90% weight/weight of polyester diols are obtained.

The second and then the third step are subsequently repeated, adapting the amounts of reagents so as to maintain an NCO/OH ratio equal, respectively, to 0.5 and 1.

A composition that is viscous at room temperature, with a viscosity at 100° C. of 22 700 mPa·s (measured with a Brookfield viscometer at 100° C., with a No. 27 needle rotating at a rate of 20 rpm), is obtained.

This composition comprises at least 90% weight/weight of polyurethanes bearing hydrolysable alkoxysilane end groups of formula (I).

The weight proportion of this composition that is obtained from renewable starting materials is 78.9% weight/weight.

EXAMPLE C (REFERENCE)

Preparation of a Composition (A) Comprising at Least 90% Weight/Weight of Polyurethanes Bearing Hydrolysable Alkoxysilane End Groups of Formula (I), Obtained from Pripol® 2033 and from 3-Methyl-1,5-Pentanedicarboxylic Acid Chloride The first step of Example A is repeated with 159.3 g (0.87 mol) of 3-methyl-1,5-pentanedicarboxylic acid chloride, and 542 g (1.00 mol) of fatty alcohol dimer Pripol® 2033 ($I_{OH}$ of 207 mg KOH/g).

625.4 g of a composition with a hydroxyl number $I_{OH}$ equal to 22.5 mg KOH/g, a Brookfield viscosity measured at 80° C. of 5640 mPa·s and comprising at least 90% weight/weight of polyester diols are obtained.

The second and then the third step are subsequently repeated, adapting the amounts of reagents so as to maintain an NCO/OH ratio equal, respectively, to 0.5 and 1.

A composition that is viscous at room temperature, with a viscosity at 100° C. of 21 150 mPa·s (measured with a Brookfield viscometer at 100° C. with a No. 27 needle rotating at a rate of 20 rpm), is obtained.

This composition comprises at least 85% weight/weight of polyurethanes bearing hydrolysable alkoxysilane end groups of formula (I).

The weight proportion of this composition that is obtained from renewable starting materials is 70.3% weight/weight.

EXAMPLE 1 (ACCORDING TO THE INVENTION)

1) Preparation of a Heat-Curable Adhesive Composition Based on the Composition of Polyurethanes Bearing Hydrolysable Alkoxysilane End Groups of Example A The composition presented in the following table is prepared by first introducing the tackifying resin Dertoline® G2L into a glass reactor under vacuum, with stirring and heated to about 130° C. Next, once the resin has completely melted, composition (A) of Example A is added.

The mixture is stirred under vacuum for 45 minutes and then cooled to 100° C. The mixture is stirred under vacuum for 20 minutes and then cooled to 80° C. The catalyst (K-Kat® 5218) is then introduced at the same time as the antioxidants Irganox® 245 and Irganox® 1010. The desiccant (Silquest A-174) is added if necessary, and the mixture is then maintained under vacuum and with stirring for a further 10 minutes.

The Brookfield viscosity of the composition thus obtained is indicated in the table.

The weight proportion of this composition that is obtained from renewable starting materials is calculated from:

the weight proportion of the composition of Example A that is obtained from renewable starting materials, weighted by the content of the said composition in the composition of the present example and from the content in the composition of the present example of Dertoline G2L, which is itself 100% of renewable origin.

The weight proportion obtained by calculation is indicated as a weight/weight percentage in the table.

2) Preparation of a PET Support Layer Coated with the Cured Composition, at a Basis Weight Rate Equal to 50 g/m²

A polyethylene terephthalate (PET) rectangular sheet 50 μm thick and 20 cm by 40 cm in size is used as support layer.

The composition obtained in 1) is preheated to a temperature close to 100° C. and is placed in a cartridge, from which a bead is extruded which is deposited close to the edge of the sheet parallel to its width.

The composition contained in this bead is then spread over the entire surface of the sheet, so as to obtain a uniform layer of substantially constant thickness. A film spreader (also known as a filmograph) is used to do this, which is moved from the edge of the sheet to the opposite edge. A layer of composition corresponding to a basis weight of 50 g/m² is thus deposited, which represents a thickness of about 50 μm.

The PET sheet thus coated is then placed in an oven at 120° C. for 8 minutes for curing of the composition, and is then laminated onto a protective non-stick layer consisting of a rectangular sheet of silicone film of the same dimensions.

The PET support layer thus obtained is subjected to the tests described below.

Peel Test at 180° on a Stainless-Steel Plate:

The adhesive power is evaluated by the peel test at 180° on a stainless-steel plate as described in FINAT method No. 1, published in the FINAT 6th edition Technical Manual, 2001. FINAT is the international federation of self-adhesive label manufacturers and transformers. The principle of this test is as follows.

A specimen in the form of a rectangular strip (25 mm×175 mm) is cut out of the PET support layer coated with the cured composition obtained previously. This specimen is fixed over ⅔ of its length (after removal of the corresponding portion of the protective non-stick layer) to a substrate consisting of a stainless-steel plate. The assembly obtained is left for 20 minutes at room temperature. It is then placed in a traction machine that is capable, starting from the free end of the rectangular strip, of peeling or detaching the strip at an angle of 180° and with a separation rate of 300 mm per minute. The machine measures the force required to detach the strip under these conditions.

The corresponding result is expressed in N/cm and indicated in the following table.

Instantaneous Adhesion Test (Also Known as the Loop Test):

The immediate bonding power or tack is evaluated by the instantaneous adhesion test known as the loop test, described in FINAT method No. 9, the principle of which is as follows.

A specimen in the form of a rectangular strip (25 mm×175 mm) is cut out of the PET support layer coated with the cured composition obtained previously. After removing all of the protective non-stick layer, the two ends of this strip are attached so as to form a loop whose adhesive layer is facing outwards. The two attached ends are placed in the movable jaw of a traction machine capable of imposing a rate of movement of 300 mm/minute along a vertical axis with possibility of travelling to and fro. The lower part of the loop placed in the vertical position is first placed in contact with a horizontal glass plate 25 mm×30 mm on a square zone with a side length of about 25 mm. Once this contact is established, the direction of movement of the jaw is reversed. The immediate bonding power is the maximum value of the force required for the loop to become fully detached from the plate.

The corresponding result is expressed in N/cm² and indicated in the following table.

Resistance Time of the Adhesive Seal to Static Shear at 90° C.:

The maintenance at elevated temperature of the adhesive power of the PET support layer obtained previously in 2) is evaluated via a test which determines the resistance time of the adhesive seal to static shear at 90° C. Reference is made for this test to FINAT method No. 8. The principle is as follows.

A specimen in the form of a rectangular strip (25 mm×75 mm) is cut out of each of the previous two PET support layers. After removing all of the protective non-stick layer, a square portion with a side length of 25 mm located at the end of the adhesive strip is fixed onto a glass plate.

The test plate thus obtained is introduced, by means of a suitable support, in a substantially vertical position into an oven at 90° C., the unattached part of the strip 50 mm long being below the plate. After thermal equilibration, the free part of the strip is connected to a 1 kg mass, the whole device still remaining throughout the duration of the test in the oven at 90° C.

Due to the effect of this mass, the adhesive seal that fixes the strip to the plate is subjected to a shear stress. To better control this stress, the test plate is in fact placed so as to make an angle of 2° relative to the vertical.

The time after which the strip detaches from the plate following rupture of the adhesive seal under the effect of this stress is noted.

This time is indicated in the following table.

EXAMPLES 2 TO 6 (ACCORDING TO THE INVENTION) AND 7-8 (COMPARATIVE)

Example 1 is repeated with the compositions indicated in the following table.

The results obtained are also indicated in the table.

| Ingredient | | Content in % weight/weight | | | | | | | |
|---|---|---|---|---|---|---|---|---|---|
| | | Ex. 1 | Ex. 2 | Ex. 3 | Ex. 4 | Ex. 5 | Ex. 6 | Ex. 7 (comp.) | Example 8 (comp.) |
| (a) Composition (A) | Nature of (A) | Ex. A | Ex. A | Ex. A | Ex. A | Ex. B | Ex. C | Ex. A | Ex. A |
| | Content of (A) | 61.11 | 51.12 | 41.11 | 38.62 | 38.62 | 38.62 | 20 | 85.0 |
| (b) Dertoline ® G2L | | 36.16 | 46.15 | 56.16 | 46.50 | 46.50 | 46.50 | 77.27 | 12.27 |

-continued

| Ingredient | Ex. 1 | Ex. 2 | Ex. 3 | Ex. 4 | Ex. 5 | Ex. 6 | Ex. 7 (comp.) | Example 8 (comp.) |
|---|---|---|---|---|---|---|---|---|
| (c) K-KAT ® 5218 | 2 | 2 | 2 | 0.50 | 0.50 | 0.50 | 2 | 2 |
| GENIOSIL ® STP-E30 | 0 | 0 | 0 | 13.15 | 13.15 | 13.15 | 0 | 0 |
| Irganox ® 245 + Irganox ® 1010 | 0.73 | 0.73 | 0.73 | 0.73 | 0.73 | 0.73 | 0.73 | 0.73 |
| Silquest ® A-174 | 0 | 0 | 0 | 0.5 | 0.50 | 0.50 | 0 | 0 |
| Brookfield viscosity at 100° C. (Pa · s) | 12.1 | 29 | 13.1 | 9.6 | 38.7 | 40 | 9.6 | 8.6 |
| Weight proportion of renewable origin (% weight/weight) | 79 | 82 | 85 | 73 | 77 | 73 | 91 | 72 |
| Peel at 180° (N/cm) | 2.9 | 7.2 | 9.1 | 5.9 | 5.2 | 5 | 0.0 | 0.4 |
| Instantaneous adhesion (N/cm$^2$) | 1.7 | 4.1 | 0.4 | 3.5 | 2.9 | 3 | 0.1 | 0.3 |
| Resistance time of the adhesive seal to static shear at 90° C. | >24 hours | >24 hours | >24 hours | >24 hours | >24 hours | >24 hours | <6' | <1' |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A heat-curable adhesive composition comprising:
   (a) from 35% to 75% weight/weight of a composition (A) comprising at least 90% weight/weight of polyurethanes bearing hydrolysable alkoxysilane end groups of formula (I):

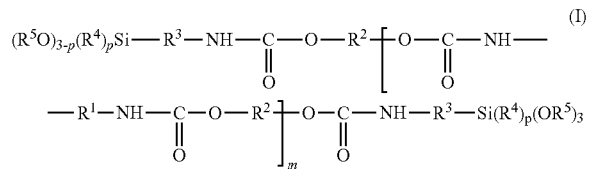

in which:
   $R^1$ represents a divalent hydrocarbon-based radical comprising from 5 to 15 carbon atoms which may be aromatic or aliphatic, and linear, branched or cyclic;
   $R^2$ represents a divalent polyester block which is derived from a polyester diol of formula $R^2(OH)_2$ by replacing each of the two hydroxyl groups with a free valency;
   $R^3$ represents a linear divalent alkylene radical comprising from 1 to 3 carbon atoms;
   $R^4$ and $R^5$, in each case, independently, represent a linear or branched alkyl radical of 1 to 4 carbon atoms;
   m is an integer such that the number-average molar mass of the polyurethanes of formula (I) is between 900 Da and 27 kDa; and
   p is an integer equal to 0, 1 or 2;
   wherein composition (A) is obtained via a process that comprises
   preparing a composition (A-1) of polyester diols of formula $R^2(OH)_2$ by reacting via a polycondensation reaction:
   (i) one or more dimerized fatty acids included in a composition (A-1-1) with an acid number $I_A$ of between 190 and 200 mg KOH/g with one or more diols comprising from 2 to 44 carbon atoms and optionally one or more heteroatoms chosen from oxygen and sulfur; or
   (ii) one or more dimerized fatty alcohols included in a composition (A-1-2) with a hydroxyl number $I_{OH}$ of between 200 and 220 mg KOH/g with one or more dicarboxylic acids comprising from 4 to 44 carbon atoms and optionally one or more heteroatoms chosen from oxygen and sulfur;
   such that said composition (A-1) has a hydroxyl number $I_{OH}$ of between 15 and 35 mg KOH/g and a Brookfield viscosity measured at 80° C. of less than 10 Pa·s;
   (b) from 22% to 62% weight/weight of a compatible tackifying resin (B) with a number-average molar mass of between 200 Da and 10 kDa; and
   (c) from 0.01% to 3% weight/weight of a crosslinking catalyst (C).

2. The heat-curable adhesive composition according to claim 1, wherein when composition (A-1) of polyester diols of formula $R^2(OH)_2$ is obtained according to variant (i), composition (A-1-1) is a composition comprising from 95% to 98% of dimerized fatty acids with an acid number $I_A$ of between 194 and 198 mg KOH/g.

3. The heat-curable adhesive composition according to claim 1, wherein when composition (A-1) of polyester diols of formula $R^2(OH)_2$ is obtained according to variant (ii), composition (A-1-2) is a composition comprising at least 96% of aliphatic dimerized fatty alcohols with an $I_{OH}$ of between 202 and 212 mg KOH/g.

4. The heat-curable adhesive composition according to claim 1, wherein composition (A-1) of polyester diols of formula $R^2(OH)_2$ has a hydroxyl number $I_{OH}$ of between 16 and 25 mg KOH/g and a Brookfield viscosity measured at 80° C. of less than 6 Pa·s.

5. The heat-curable adhesive composition according to claim 1, wherein $R^1$ is chosen from one of the following divalent radicals, of which the formulae below reveal the two free valencies:

a)

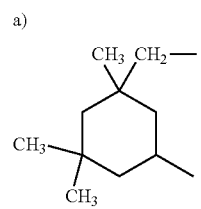

b)

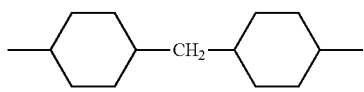

c)

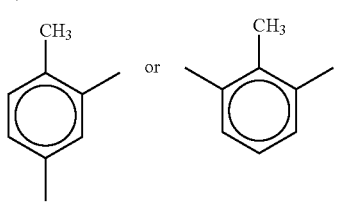

d)

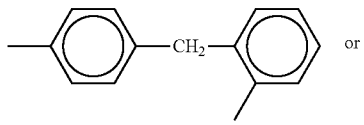

e) —(CH$_2$)$_6$.

6. The heat-curable adhesive composition according to claim 1, wherein R$^1$ is

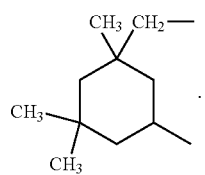

7. The heat-curable adhesive composition according to claim 1, wherein

R$^3$ is methylene or n-propylene;

R$^4$ and R$^5$ each independently represent methyl or ethyl; and/or p equals 0 or 1.

8. The heat-curable adhesive composition according to claim 1, wherein tackifying resin (B) is chosen from:

(iii) rosins of natural or modified origin and hydrogenated, dimerized or polymerized derivatives thereof or derivatives esterified with monoalcohols or polyols; or (v) terpenic resins in the presence of Friedel-Crafts catalysts.

9. The heat-curable adhesive composition according to claim 1, wherein said composition comprises:

(a) from 40% to 65% weight/weight of composition (A), (b) from 33% to 58% weight/weight of tackifying resin (B), and (c) from 0.45% to 2.5% weight/weight of crosslinking catalyst (C).

10. The heat-curable adhesive composition according to claim 1, further comprising a polymer of formula (V):

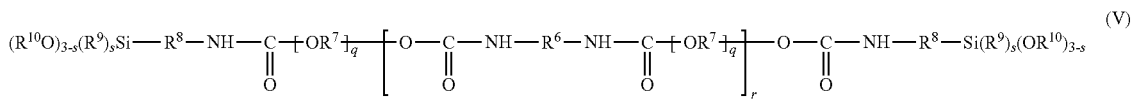

in which:

R$^6$ represents a divalent hydrocarbon-based radical comprising from 5 to 15 carbon atoms, which is aromatic or aliphatic, and linear, branched or cyclic;

R$^7$ represents a linear or branched divalent alkylene radical comprising from 1 to 4 carbon atoms;

R$^8$ represents a linear divalent alkylene radical comprising from 1 to 3 carbon atoms;

R$^9$ and R$^{10}$, in each case, independently, represent a linear or branched alkyl radical of 1 to 4 carbon atoms;

q is an integer such that the number-average molar mass of a polyether block of formula —[OR$^7$]$_q$— is between 300 Da and 30 kDa;

r is either equal to zero or to a non-zero integer such that the number-average molar mass of the polymer of formula (V) is between 600 Da and 60 kDa; and s is an integer equal to 0, 1 or 2, wherein the amount of said polymer of formula (V) is up to 15% weight/weight.

11. The heat-curable adhesive composition according to claim 10, wherein in the polymer of formula (V) r equals 0.

12. The heat-curable adhesive composition according to claim 10, wherein in the polymer of formula (V):

R$^7$ is isopropylene;

R$^8$ is methylene;

s=0 or 1; and

R$^9$ and R$^{10}$ each represent methyl.

13. The heat-curable adhesive composition according to claim 1, wherein said composition has a Brookfield viscosity measured at 100° C. of between 9 and 100 Pa·s.

14. A self-adhesive support that is obtained via a process comprising:

(a) preheating the adhesive composition as defined in claim 1 to a temperature of between 50 and 130° C., and then (b) coating said adhesive composition on a support layer, and then (c) curing said adhesive composition, by heating the support thus coated to a temperature of between 50 and 150° C.

15. A one-sided or two-sided self-adhesive label or tape comprising the self-adhesive support of claim 14.

16. The heat-curable adhesive composition according to claim 1, wherein wherein composition (A) is obtained via a process comprising:
(a) preparing a composition (A-1) of polyester diols of formula $R^2(OH)_2$ by reacting via a polycondensation reaction:
(i) one or more dimerized fatty acids included in a composition (A-1-1) with an acid number $I_A$ of between 190 and 200 mg KOH/g with one or more diols comprising from 2 to 44 carbon atoms and optionally one or more heteroatoms chosen from oxygen and sulfur; or
(ii) one or more dimerized fatty alcohols included in a composition (A-1-2) with a hydroxyl number $I_{OH}$ of between 200 and 220 mg KOH/g with one or more dicarboxylic acids comprising from 4 to 44 carbon atoms and optionally one or more heteroatoms chosen from oxygen and sulfur;
such that said composition (A-1) has a hydroxyl number $I_{OH}$ of between 15 and 35 mg KOH/g and a Brookfield viscosity measured at 80° C. of less than 10 Pa·s;
(b) preparing a composition (A-2) comprising at least 90% weight/weight of polyurethanes bearing hydroxyl end groups by reacting polyester diol Composition (A-1) with diisocyanate of formula (II):

$$NCO—R^1—NCO \qquad (II)$$

in amounts corresponding to a ratio of the molar equivalent of the number of NCO/OH functions of between 0.3 and 0.7, to obtain polyurethanes bearing hydroxyl end groups of formula (III):

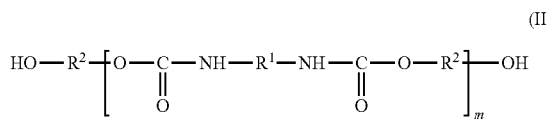

(III)

in which m is less than or equal to 10; and
(c) preparing composition (A) comprising at least 90% weight/weight of polyurethanes bearing alkoxysilane end groups of formula (I) by reacting Composition (A-2) of polyurethanes bearing hydroxyl end groups with an isocyanatosilane of formula (IV):

$$NCO—R^3—Si(R^4)p(OR^5)_{3-p} \qquad (IV)$$

in an amount corresponding to a ratio of the molar equivalent of NCO/OH functions of between 0.90 and 1.05.

17. The heat-curable adhesive composition according to claim 1, wherein
$R^3$ is methylene or n-propylene;
$R^4$ and $R^5$ each independently represent methyl or ethyl; and
p equals 0 or 1.

18. The heat-curable adhesive composition according to claim 10, wherein the polymer of formula (V) has a number-average molar mass ranging from 30 to 40 kDa and a viscosity, measured at 23° C., ranging from 30 to 37 Pa·s.

19. The heat-curable adhesive composition according to claim 10, wherein the polymer of formula (V) has a polydispersity index ranging from 1 to 2.

20. The heat-curable adhesive composition according to claim 16, wherein composition (A-1) of polyester diols of formula $R^2(OH)_2$ is prepared by reacting, via a polycondensation reaction, one or more dimerized fatty acids included in a composition (A-1-1) with an acid number $I_A$ of between 190 and 200 mg KOH/g with one or more diols comprising from 2 to 44 carbon atoms and optionally one or more heteroatoms chosen from oxygen and sulfur.

21. The heat-curable adhesive composition according to claim 16, wherein composition (A-1) of polyester diols of formula $R^2(OH)_2$ is prepared by reacting, via a polycondensation reaction, one or more dimerized fatty alcohols included in a composition (A-1-2) with a hydroxyl number $I_{OH}$ of between 200 and 220 mg KOH/g with one or more dicarboxylic acids comprising from 4 to 44 carbon atoms and optionally one or more heteroatoms chosen from oxygen and sulfur.

\* \* \* \* \*